United States Patent [19]
Kale et al.

[11] Patent Number: 5,849,823
[45] Date of Patent: Dec. 15, 1998

[54] HOMOGENEOUSLY BRANCHED ETHYLENE α-OLEFIN INTERPOLYMER COMPOSITIONS FOR USE IN GASKET APPLICATIONS

[75] Inventors: Lawrence T. Kale; Robert R. Turley; Pradeep Jain; Lonnie G. Hazlitt, all of Lake Jackson, Tex.

[73] Assignee: The Dow Chemical Company, Midland, Mich.

[21] Appl. No.: 706,476

[22] Filed: Sep. 4, 1996

[51] Int. Cl.$^6$ ............................. C08L 23/08; C08L 23/16; C08K 5/20
[52] U.S. Cl. ........................ 524/232; 525/106; 525/199; 525/240
[58] Field of Search ............................ 524/232; 525/106, 525/240, 199

[56] References Cited

U.S. PATENT DOCUMENTS

| | | | |
|---|---|---|---|
| 3,280,220 | 10/1966 | Nelson | 260/897 |
| 3,645,992 | 2/1972 | Elston | 260/80.78 |
| 3,914,342 | 10/1975 | Mitchell | 260/897 A |
| 4,076,698 | 2/1978 | Anderson et al. | 526/348.6 |
| 4,366,292 | 12/1982 | Werner et al. | 525/240 |
| 4,429,079 | 1/1984 | Shibata et al. | 525/240 |
| 4,438,238 | 3/1984 | Fukushima et al. | 525/240 |
| 4,461,873 | 7/1984 | Bailey et al. | 525/240 |
| 4,530,914 | 7/1985 | Ewen et al. | 502/113 |
| 4,535,113 | 8/1985 | Foster et al. | 524/262 |
| 4,544,762 | 10/1985 | Kaminsky et al. | 556/179 |
| 4,701,432 | 10/1987 | Welborn | 502/113 |
| 4,786,697 | 11/1988 | Cozewith et al. | 526/88 |
| 4,789,714 | 12/1988 | Cozewith et al. | 526/88 |
| 4,798,081 | 1/1989 | Hazlitt et al. | 75/53 |
| 4,874,820 | 10/1989 | Cozewith et al. | 525/240 |
| 4,935,474 | 6/1990 | Ewen et al. | 526/114 |
| 4,937,299 | 6/1990 | Ewen et al. | 526/119 |
| 5,008,204 | 4/1991 | Stehling | 436/85 |
| 5,015,749 | 5/1991 | Schmidt et al. | 556/179 |
| 5,026,798 | 6/1991 | Canich | 526/127 |
| 5,041,584 | 8/1991 | Crapo et al. | 556/179 |
| 5,041,585 | 8/1991 | Deavenport et al. | 556/179 |
| 5,064,802 | 11/1991 | Stevens et al. | 502/155 |
| 5,132,380 | 7/1992 | Stevens et al. | 526/126 |
| 5,153,157 | 10/1992 | Hlatky et al. | 502/117 |
| 5,189,192 | 2/1993 | LaPointe et al. | 556/11 |
| 5,206,075 | 4/1993 | Hodgson | 428/216 |
| 5,246,783 | 9/1993 | Spenadel et al. | 428/461 |
| 5,272,236 | 12/1993 | Lai et al. | 526/348.5 |
| 5,278,272 | 1/1994 | Lai et al. | 526/348.5 |
| 5,281,679 | 1/1994 | Jejelowo et al. | 526/114 |
| 5,322,728 | 6/1994 | Davey et al. | 428/296 |
| 5,374,696 | 12/1994 | Rosen et al. | 526/126 |
| 5,382,630 | 1/1995 | Stehling et al. | 525/240 |
| 5,382,631 | 1/1995 | Stehling et al. | 525/240 |
| 5,453,410 | 9/1995 | Kolthammer et al. | 502/155 |
| 5,470,811 | 11/1995 | Jejelowo et al. | 502/117 |
| 5,470,993 | 11/1995 | Devore et al. | 556/11 |
| 5,494,874 | 2/1996 | Rosen et al. | 502/155 |
| 5,519,091 | 5/1996 | Tsutsui et al. | 525/240 |
| 5,530,065 | 6/1996 | Farley et al. | 525/240 |
| 5,532,394 | 7/1996 | Rosen et al. | 556/11 |
| 5,548,014 | 8/1996 | Tse et al. | 525/240 |
| 5,594,071 | 1/1997 | Takahashi et al. | 525/240 |
| 5,597,194 | 1/1997 | Daugherty et al. | 525/240 |
| 5,605,969 | 2/1997 | Tsutsui et al. | 525/240 |
| 5,656,696 | 8/1997 | Yamamoto et al. | 525/240 |

FOREIGN PATENT DOCUMENTS

| | | |
|---|---|---|
| 0 416 815 | 3/1991 | European Pat. Off. . |
| 0 447 035 | 9/1991 | European Pat. Off. . |
| 63-63712 | 3/1988 | Japan . |
| WO 94/17112 | 8/1994 | WIPO . |
| WO 95/04761 | 2/1995 | WIPO . |
| WO 95/05427 | 2/1995 | WIPO . |
| WO 96/16119 | 5/1996 | WIPO . |

OTHER PUBLICATIONS

Van der Sanden, et al., A New Family of Linear Ethylene Polymers Provides Enhanced Sealing Performand, *Tappi Journal,* pp. 99–103, (1992).

Randall, "Ethylene–Based Polymers", Rev. Macromol. Chem. Phys., C29(29.3), pp. 285–297 (1989).

Wild et al., "Determination of Branching Distributions in Polyethylene and Ethylene Copolymers", *Journal of Poly Sci., Poly. Phys. Ed.,* 20, p. 441 (1982).

Williams and Ward, "The Construction of a Polyethylene Calibration Curve for Gel Permeation Chromatography Using Polystyrene Fractions", *J. of Poly. Sci. Polymer Letters,* 6 (621) 1968.

Ramamurthy, A.V., "Wall Slip in Viscous Fluids and Influence of Materials of Construction", *Journal of Rheology,* 30 (2), 337–357, 1986.

Sakota, Y., Specialty Plastics Conference, 1988.
Tanaka, K., Specialty Plastics Conference, 1990.
Tominari, K., Specialty Plastics Conference, 1986.

*Primary Examiner*—Donald R. Wilson

[57] ABSTRACT

This application relates to flexible gaskets formed from blends of linear or substantially linear homogeneously branched ethylene/α-olefin interpolymers and that possess improved processability as well as low temperature resistance and resistance to staining and attack by microbes. Such gaskets do not require formulation other than the addition of color, to produce a functional product. The gaskets of the present invention do not impact negatively on the environment and are also relatively inexpensive to produce.

10 Claims, 6 Drawing Sheets

GPC 16350: Mw = 77500, Mn = 8700, Mw/Mn = 8.908

GPC 16351: Mw = 75900, Mn = 12400, Mw/Mn = 6.121

GPC 15848: Mw = 71800, Mn = 12400, Mw/Mn = 5.79

Shore A Hardness versus Density

········· Examples of the invention

——— Conventional polyethylene having MWD of about 2

HOMOGENEOUSLY BRANCHED ETHYLENE α-OLEFIN INTERPOLYMER COMPOSITIONS FOR USE IN GASKET APPLICATIONS

CROSS-REFERENCE TO RELATED APPLICATIONS

This application is related to pending application entitled "Gaskets Made From Olefin Polymers" filed on Aug. 8, 1996 in the names of A. R. Whetten, R. P. Markovich, S. M. Hoenig and E. E. Greene, which is a continuation-in-part of pending application Ser. No. 08/312,014 filed Sep. 23, 1994, now abandoned, which itself is a continuation of application Ser. No. 08/108,856 filed Aug. 18, 1993 (now abandoned); a continuation in part of pending application Ser. No. 08/551,659 filed Mar. 1, 1995, which is a continuation of Ser. No. 08/392,287 filed Feb. 22, 1995 (now abandoned) which itself is a continuation of application Ser. No. 08/108,855 filed Aug. 18, 1993 (now abandoned); a continuation in part of pending application Ser. No. 08/615,549, filed Mar. 11, 1996, now U.S. Pat. No. 5,723,507; and is also related to U.S. Pat. No. 5,272,236, to U.S. Pat. No. 5,278,272, to U.S. Pat. No. 5,340,840, and to U.S. Pat. No. 5,288,762, the disclosure of each of which is incorporated herein by reference. This application is also related to provisional application Ser. No. 60/012,873 filed Mar. 5, 1996, the disclosure of which is incorporated herein by reference.

FIELD OF THE INVENTION

This invention relates to gaskets made from certain polymer compositions. In particular, this application relates to flexible gaskets formed from blends of homogeneously branched ethylene/α-olefin interpolymers, preferably those interpolymers that contain long chain branching. Such gaskets possess improved processability as well as improved low temperature flexibility and resistance to microbial attack and staining.

BACKGROUND OF THE INVENTION

Gaskets are used in a variety of applications, for example in appliances such as refrigerators and freezers requiring a flexible gasket for sealing the area between the door and appliance body. One of the most commonly used materials for the production of gaskets is polyvinyl chloride (PVC). However, gaskets composed of PVC suffer from several disadvantages. PVC requires compounding and formulating in order to incorporate the various additives necessary for imparting desirable properties to the gaskets. Besides the additional time and money required for the additional mixing steps, additives such as plasticisers can absorb spills and become discolored. Plasticiser additives are also susceptible to attack by microbes which can also lead to discoloration of the gasket, e.g., black stains. Furthermore, PVC gaskets become brittle at low temperatures and cracking becomes a problem. Thus at low temperatures, PVC gaskets are difficult to install. PVC gaskets are also perceived as having a negative impact on the environment.

Thermoplastic polyolefins (TPOs) are also used in the production of flexible gaskets. TPO's are not PVC-based (thus eliminating the negatives of PVC), but rather are typically blends of polypropylene and low modulus elastomers, but while these TPO's are effective in gasketing applications, they require an extra "off-line" blending step which negatively contributes to the cost of the formulation. For the TPO's, oils are sometimes added which can also contribute to discoloration.

Both substantially linear ethylene polymers (SLEPS), such as those taught by U.S. Pat. No. 5,272,236 and U.S. Pat. No. 5,278,272, and homogeneously branched linear ethylene polymers have been proposed for flexible gaskets, however these polymers may not be used alone for flexible gaskets, especially when using flat plate dies which are notorious for inducing melt fracture. Even though the substantially linear ethylene polymers have reduced melt fracture relative to the comparative linear ethylene polymers due to the presence of long chain branching, the demands of the flat plate dies still creates a need for ethylene polymers which retain flexibility while simultaneously having a smooth gasketing surface (i.e., little or no melt fracture). While increasing the melt index has been found to remedy melt fracture in substantially linear ethylene polymers, such increased melt index polymers suffer problems with melt strength, i.e., low melt strength resins simply drool from the die with no profile definition. Thus, in the design of resins for gasket applications, it is desirable to maximize the low shear viscosity and minimize the high shear viscosity.

A material is needed for flexible gaskets that does not require formulation (other than color) to produce a functional product. Such a material should be stain resistant and not be susceptible to attack by microbes. Further desirable characteristics of such a gasket are that it possess improved low temperature flexibility and not impact negatively on the environment. Such a gasket should also retain properties over time, since current PVC technology using plasticiser often has plasticiser migration problems creating embrittlement. Lastly, a gasket material is needed which incorporates all of the above features and which is also relatively inexpensive to produce. These and other advantages are taught by the present invention.

SUMMARY OF THE INVENTION

This invention relates to a gasket composition comprising:

(A) at least one homogeneously branched ethylene/α-olefin interpolymer that comprises from about 10 to about 90 weight percent, by weight of the gasket composition, said homogeneously branched interpolymer having a melt index from about 0.001 dg/min to about 50 dg/min;

(B) at least one second homogeneously branched ethylene/α-olefin interpolymer having a melt index greater than (A) and a melt index from about 20 dg/min to about 5000 dg/min;

wherein (A) and (B) have a density difference of 0.002 g/cm$^3$ and greater up to about 0.11 g/cm$^3$; and wherein the resulting gasket composition has an overall melt index of about 0.5 to about 50 dg/min, $M_w/M_n$ from 2 to about 14, and a density of 0.857 g/cm$^3$ to about 0.91 g/cm$^3$.

Yet another embodiment of the present invention involves a composition as described above which also contains a lubricant.

Yet another aspect of the present invention includes gaskets made from the compositions as described above. An example of such a gasket comprises an ethylene interpolymer composition, wherein the composition has:

(1) at least two discernible melting peaks, as determined using differential scanning calorimetry, or
(2) at least two discernible molecular weight peaks, as determined using gel permeation chromatography, and
(3) a melt flow ratio, $I_{10}/I_2$, from 6 to about 51, and
(4) a Shore A hardness $< b_0 + b_1(\text{density}) + b_2(\text{density})^2$ where $b_0 = -9{,}679$, $b_1 = 21{,}360$ and $b_2 = -11{,}668$, where density is units of grams/cm$^3$, (5) a tangent flexural modulus (Flex Mod) (psi)>$b_0$, +$b_1$(density) +$b_2$(density)$^2$, where $b_0$=5,795,477, $b_1$=−13,399,463 and $b_2$=7,747,721, and where density is in units of grams/cm$^3$.

DETAILED DESCRIPTION OF THE INVENTION

Figure 1:
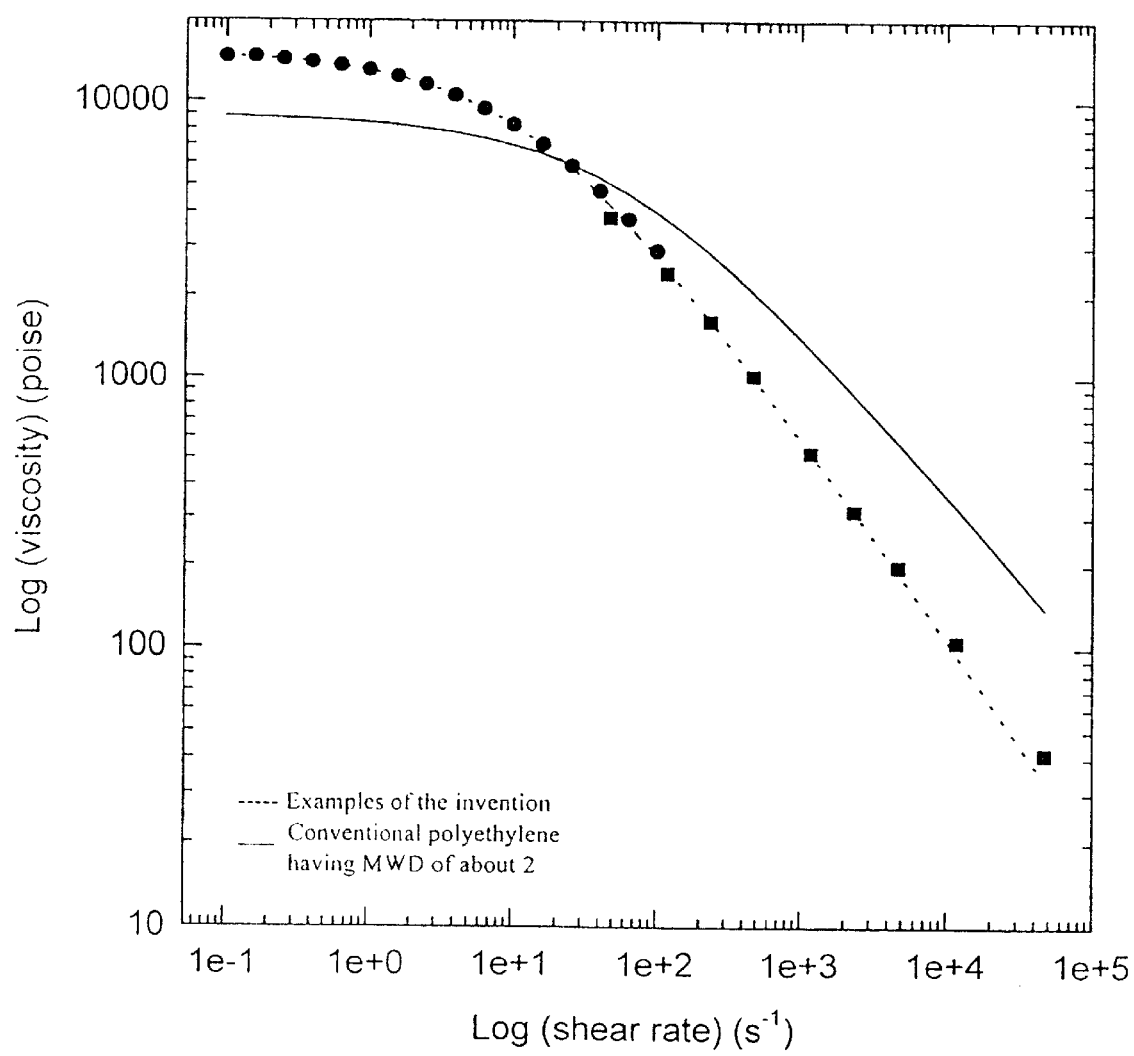
FIG. 1 illustrates viscosity versus shear rate of a comparative substantially linear ethylene/1-octene copolymer having an $I_2$ of 10.57 decigram/minute (dg/min), $I_{10}/I_2$ of about 8, $M_w/M_n$ of about 2, and a density of 0.8747 g/cm$^3$ compared with Blend B, a substantially linear ethylene/1-octene interpolymer composition of the invention having an $I_2$ of 10.57, $I_{10}/I_2$ of 27, $M_w/M_n$ of about 8.9, and a density of 0.8747 g/cm$^3$.
Figure 2:
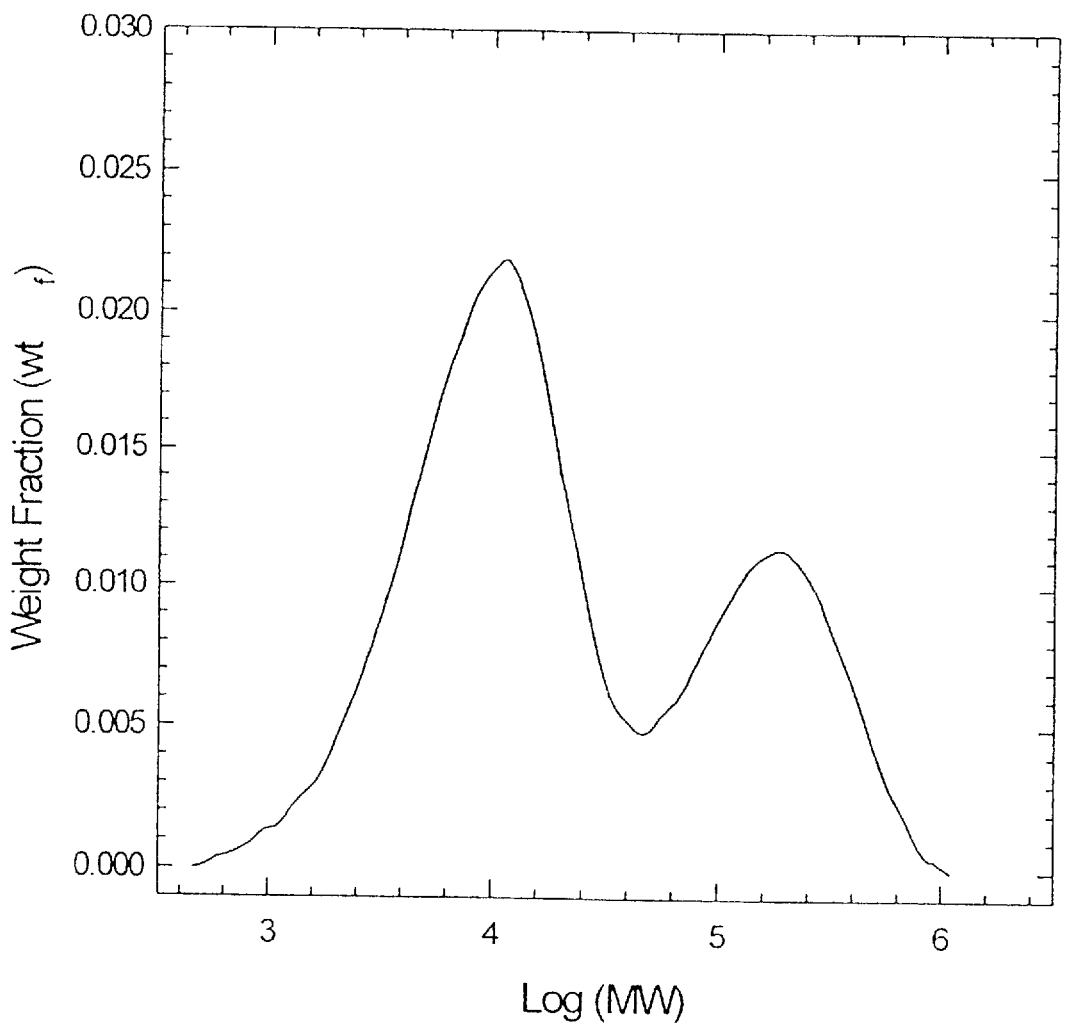
FIG. 2 illustrates the gel permeation chromatogram for Blend A, a substantially linear ethylene/1-octene interpolymer composition of the present invention having a melt index of 10.81 dg/min, $I_{10}/I_2$=19.8, a density of 0.8704 g/cm$^3$, $M_w$=71800, $M_n$=12400, and $M_w/M_n$=5.79.
Figure 3:
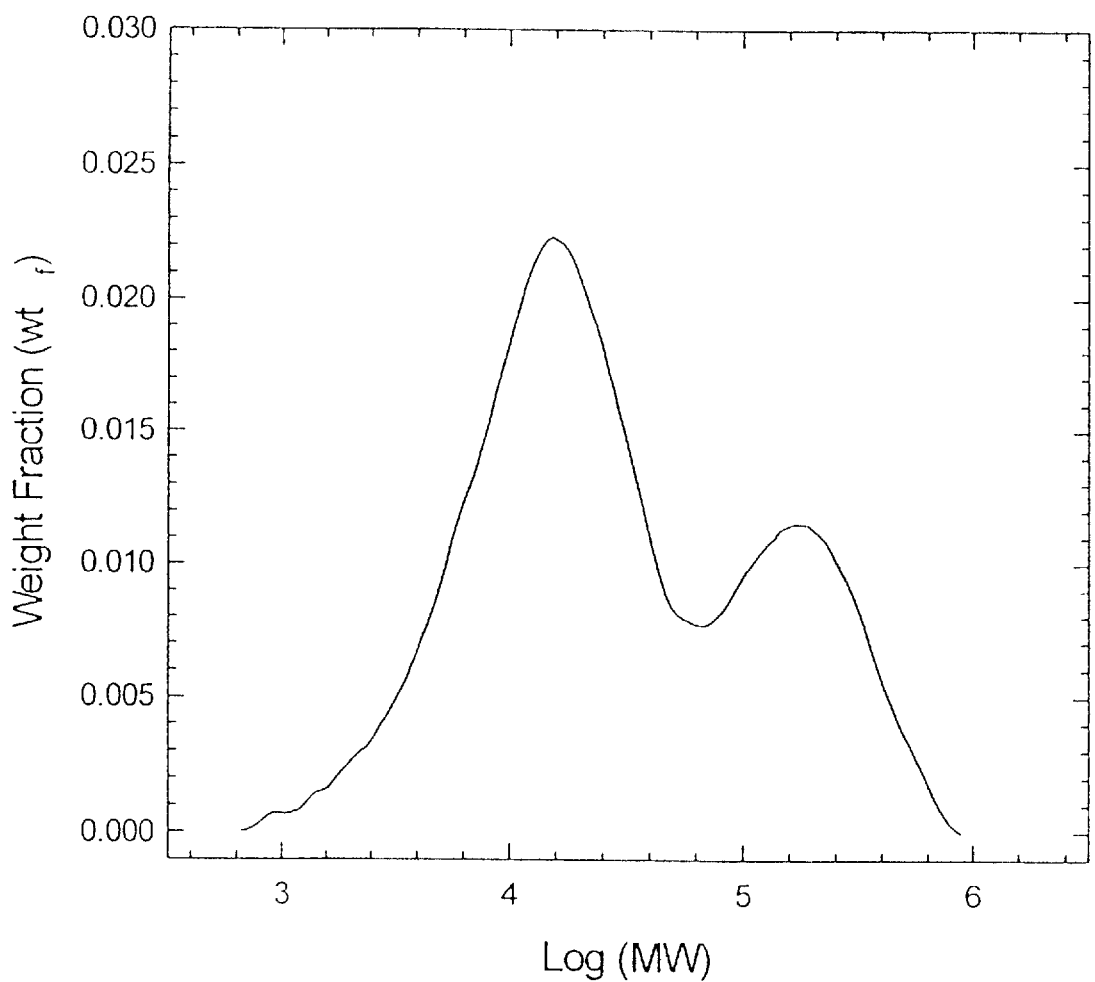
FIG. 3 illustrates the gel permeation chromatogram for Blend B, a substantially linear ethylene/1 -octene interpolymer composition of the present invention having a melt index of 10.57 dg/min, $I_{10}/I_2$=27, a density of 0.8747 g/cm$^3$, $M_w$=77500, $M_n$=8700, and $M_w/M_n$=8.9.
Figure 4:
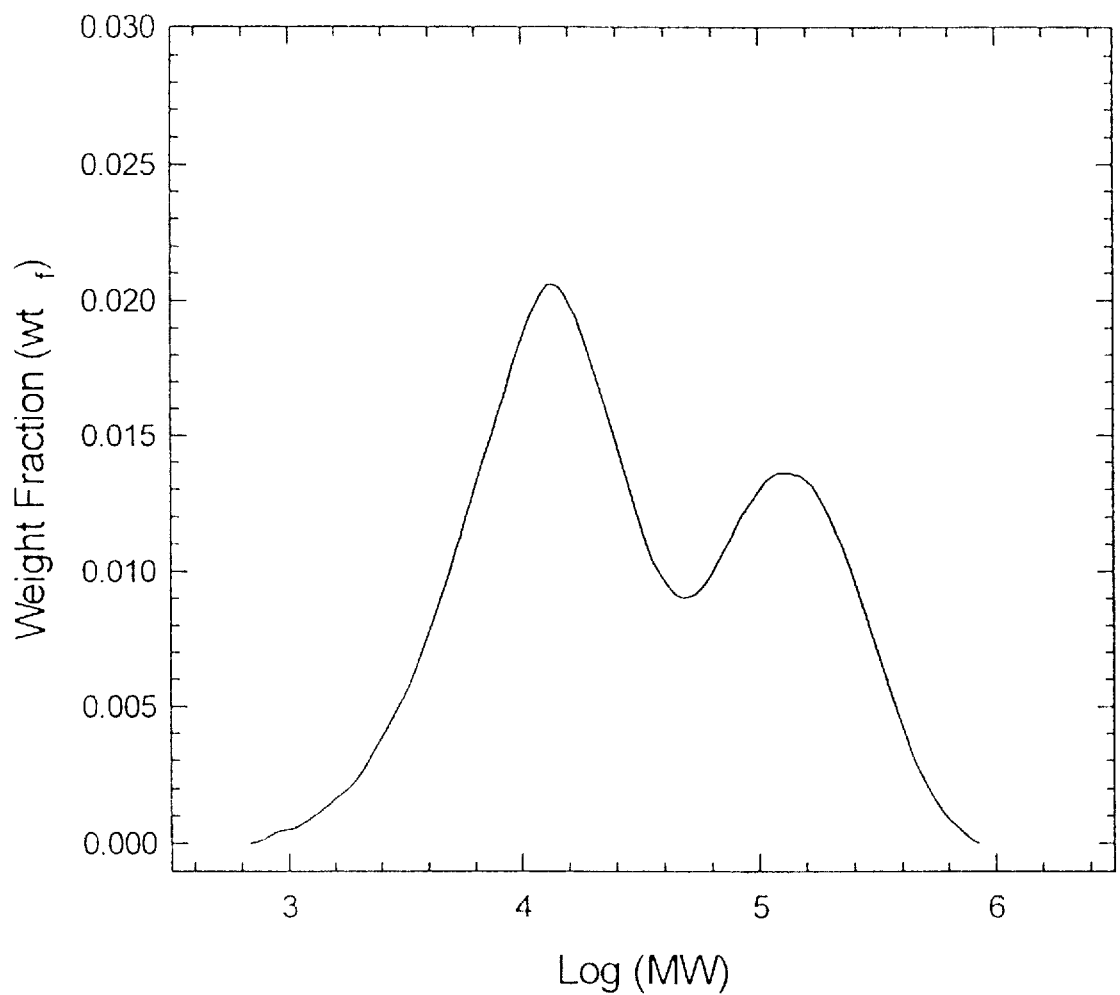
FIG. 4 illustrates the gel permeation chromatogram for Blend C, a substantially linear ethylene/1-octene interpolymer composition of the present invention having a melt index of 9.03 dg/min, $I_{10}/I_2$=19.19, a density of 0.8821 g/cm$^3$, $M_w$=75900, $M_n$=12400, and $M_w/M_n$=6.12.

The term "linear ethylene polymers" used herein means that the ethylene polymer does not have long chain branching. That is, the linear ethylene polymer has an absence of long chain branching, as for example the traditional heterogeneous linear low density polyethylene polymers or linear high density polyethylene polymers made using Ziegler polymerization processes (e.g., U.S. Pat. No. 4,076,698 (Anderson et al.), the disclosure of which is incorporated herein by reference), sometimes called heterogeneous polymers. The Ziegler polymerization process, by its catalytic nature, makes polymers which are heterogeneous, i.e., the polymer has several different types of branching within the same polymer composition as a result of numerous metal atom catalytic sites. In addition, the heterogeneous polymers produced in the Ziegler process also have broad molecular weight distributions ($M_w/M_n$); as the $M_w/M_n$ increases, the $I_{10}/I_2$ ratio concurrently increases.

The term "linear ethylene polymers" does not refer to high pressure branched polyethylene (LDPE), ethylene/vinyl acetate (EVA) copolymers, or ethylene/vinyl alcohol (EVOH) copolymers which are known to those skilled in the art to have numerous long chain branches. The term "linear ethylene polymers" can refer to polymers made using uniform branching distribution polymerization processes, sometimes called homogeneous polymers. Such uniformly branched or homogeneous polymers include those made as described in U.S. Pat. No. 3,645,992 (Elston), the disclosure of which is incorporated herein by reference, and those made using so-called single site catalysts in a batch reactor having relatively high olefin concentrations (as described in U.S. Pat. No. 5,026,798 (Canich) or in U.S. Pat. 5,055,438 (Canich), the disclosures of which are incorporated herein by reference) or those made using constrained geometry catalysts in a batch reactor also having relatively high olefin concentrations (as described in U.S. Pat. 5,064,802 (Stevens et al.), the disclosure of which is incorporated herein by reference, or in EPA 0 416 815 A2 (Stevens et al.)). The uniformly branched/homogeneous polymers are those polymers in which the comonomer is randomly distributed within a given interpolymer molecule and wherein substantially all of the interpolymer molecules have the same ethylene/comonomer ratio within that interpolymer, but the linear version of these polymers have an absence of long chain branching, as, for example, Exxon Chemical has taught in their February 1992 Tappi Journal paper.

The term "substantially linear" means that the polymer has long chain branching and that the polymer backbone is substituted with 0.01 long chain branches/1000 carbons to 3 long chain branches/1000 carbons, more preferably from 0.01 long chain branches/1000 carbons to 1 long chain branches/1000 carbons, and especially from 0.05 long chain branches/1000 carbons to 1 long chain branches/1000 carbons. Similar to the traditional linear homogeneous polymers, the substantially linear ethylene/α-olefin interpolymers used in this invention also have a homogeneous branching distribution and only a single melting peak (determined using differential scanning calorimetry (DSC) using a second heat and a scan rate of 10° C./minute from −40° C. to 160° C.), as opposed to traditional Ziegler polymerized heterogeneous linear ethylene/α-olefin copolymers which have two or more melting peaks (determined using differential scanning calorimetry (DSC)). The substantially linear ethylene polymers and interpolymers are described in U.S. Pat. No. 5,272,236 and U.S. Pat. No. 5,278,272, the disclosures of which are incorporated herein by reference.

Long chain branching for the substantially linear ethylene polymers is defined herein as a chain length of at least 6 carbons, above which the length cannot be distinguished using $^{13}$C nuclear magnetic resonance spectroscopy. The long chain branch of the substantially linear ethylene polymers is, of course, at least one carbon longer than two carbons less than the total length of the comonomer copolymerized with ethylene. For example, in an ethylene/1-octene substantially linear polymer, the long chain branch will be at least seven carbons in length; however as a practical matter, the long chain branch has to be longer than the side chain resulting from incorporation of comonomer. For substantially linear ethylene/alpha-olefin copolymers, the long chain branch is also itself homogeneously branched, as is the backbone to which the branch is attached.

For ethylene homopolymers and certain ethylene/alpha-olefin copolymers, long chain branching is determined by using $^{13}$C nuclear magnetic resonance spectroscopy and is quantified using the method of Randall (*Rev. Macromol. Chem. Phys.*, C29 (2&3), pp. 285–297) the disclosure of which is incorporated herein by reference.

The CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or as described in U.S. Pat. No. 4,798,081 or as is described in U.S. Pat. No. 5,008,204 (Stehling), the disclosure of which is incorporated herein by reference. The technique for calculating CDBI is described in U.S. Pat. No. 5,322,728 (Davey et al.) and in U.S. Pat. No. 5,246,783 (Spenadel et al.). The CDBI for the homogeneously branched linear or homogeneously branched substantially linear olefin polymers of the present invention is greater than about 30 percent, preferably greater than about 50 percent, and especially greater than about 90 percent.

A unique characteristic of the substantially linear olefin polymers used in the present invention is a highly unexpected flow property where the $I_{10}/I_2$ value is essentially independent of polydispersity index (i.e. $M_w/M_n$). This is contrasted with conventional Ziegler polymerized heterogeneous polyethylene resins and with conventional single site catalyst polymerized homogeneous linear polyethylene resins having rheological properties such that as the polydispersity index increases (or the MWD), the $I_{10}/I_2$ value also increases.

The density of the substantially linear homogeneously branched ethylene or linear homogeneously branched ethylene/α-olefin interpolymers and for the interpolymer compositions used in the present invention is measured in accordance with ASTM D-792 and for the individual components is generally from about 0.85 g/cm³ to about 0.96 g/cm³, provided that other conditions specified herein are met (e.g., density difference of greater than 0.002 g/cm³ and less than or equal to about 0.11 g/cm³ between each component).

The densities of the individual blend components are determined by the overall blend composition and the overall blend density. The overall blend density for the homogeneous ethylene interpolymer/homogeneous ethylene interpolymer blend is from about 0.857 to about 0.91 g/cm³, preferrably from about 0.86 to about 0.9 g/cm³, most preferably from about 0.87 to about 0.895 g/cm³. The most preferred density is determined by the specific application. More specifically, the most preferred density is determined by the modulus or flexibility required in the final part. Recent studies suggest that a density of 0.87 to 0.88 g/cm³ is most preferred for a refrigerator gasket while the most preferred density for a door gasket is 0.88 to 0.895 g/cm³.

Table 1 illustrates the density ranges of the individual components given the most preferred blend composition (25 to 40 wt % of the composition comprising the higher molecular weight component) and the most preferred overall density range of 0.87 to 0.895 g/cm³. Table 1 assumes the difference in density between the high and low molecular weight fractions are 0.02 g/cm³. The operative difference in density between the two components of the blend is equal to or greater than 0.002 g/cm³ and equal to or less than 0.11 g/cm³, with preferred of equal to or greater than 0.002 g/cm³ and less than or equal to 0.05 g/cm³ and most preferred of equal to or greater than 0.002 g/cm³ and less than or equal to 0.03 g/cm³.

TABLE 1

Density of the blend components, using the most preferred weight fractions and overall densities.

| Most Preferred wt % High MW | Most Preferred Overall Density (g/cm³) | Density High MW Component (g/cm³) | Density Low MW Component (g/cm³) | Density Difference (g/cm³) |
|---|---|---|---|---|
| 25 | 0.870 | 0.855 | 0.875 | 0.02 |
| 25 | 0.895 | 0.880 | 0.90 | 0.02 |
| 40 | 0.870 | 0.858 | 0.878 | 0.02 |
| 40 | 0.895 | 0.883 | 0.903 | 0.02 |

Figure 5:
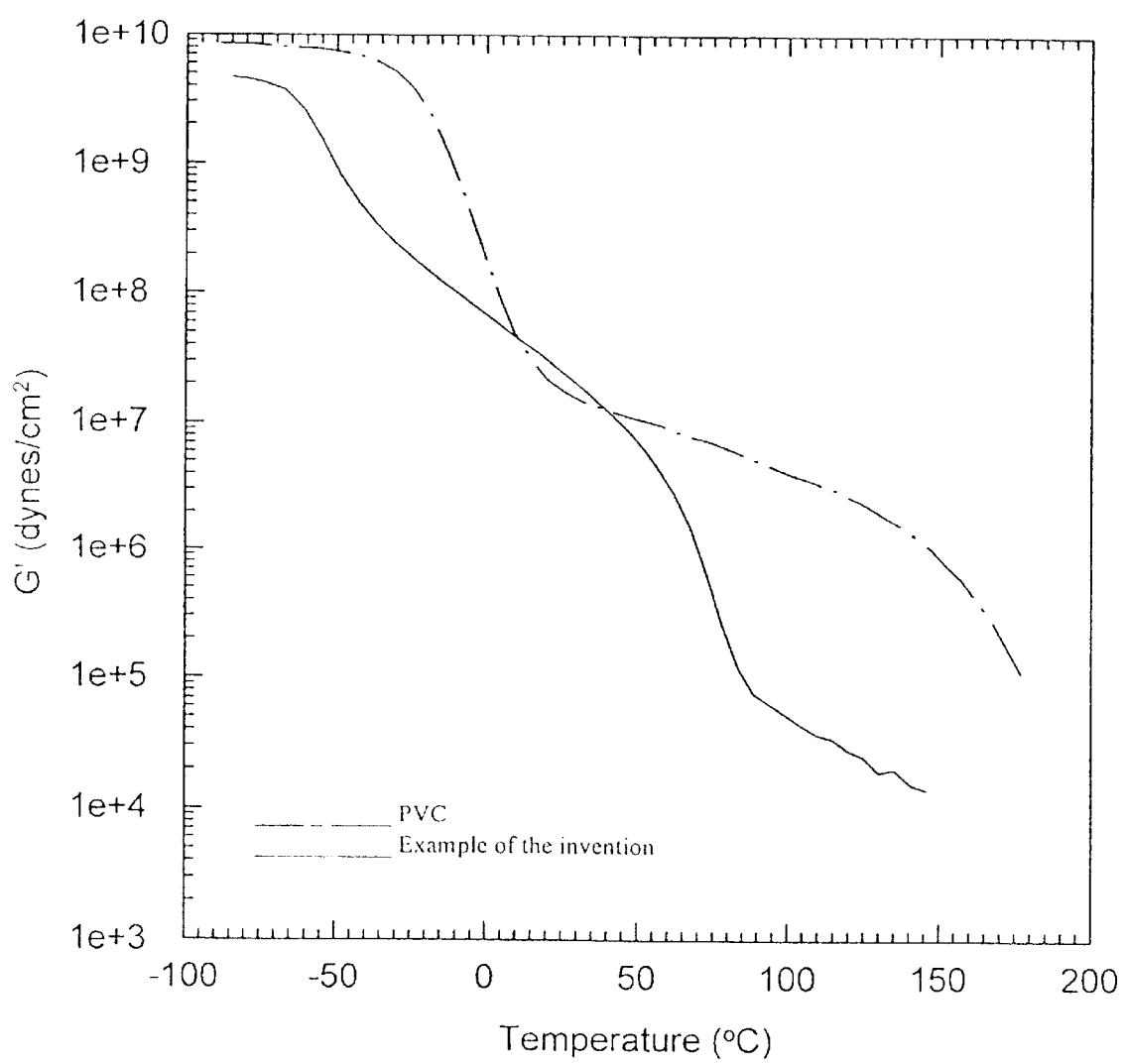
FIG. 5 compares storage modulus, G', (dynes/cm$^2$) versus temperature (°C.) for Blend B, a substantially linear ethylene/1-octene interpolymer composition of the present invention having a melt index of 10.57 dg/min $I_{10}/I_2$=27, a density of 0.8747 g/cm$^3$, $M_w$=77500, $M_w$=8700, and $M_w/M_n$=8.9 and a comparative PVC composition having a melt index of 2.75 dg/min and a density of 1.39 g/cm$^3$.

The gaskets of the present invention also retain flexibility at low temperature, as evidenced by FIG. 5, which compares a composition of the invention (Blend B) with a conventional PVC gasket formulation. G' (the storage modulus, which is an indication of stiffness) values of Blend B are consistently lower than those for PVC, at the same temperatures in the range from about −60° C. to about 0° C. (the effective service temperature of a refrigerator or freezer). Thus gaskets of the present invention have improved flexibility relative to PVC at lower temperatures. FIG. 5 also shows that the gaskets of the present invention also have lower heat resistance relative to PVC. Lower heat resistance becomes a concern when shipping fabricated gaskets to the original equipment manufacturer (OEM) for installation. Gaskets made from the compositions of the invention also have higher temperature stability than conventional narrow molecular weight distribution polyethylene, which is especially useful during shipping.

The molecular weight of the homogeneously branched linear or homogeneously branched substantially linear olefin polymer compositions used in the present invention is conveniently indicated using a melt index measurement according to ASTM D-1238, Condition 190° C./2.16 kg (formally known as "Condition (E)" and also known as $I_2$). Melt index is inversely proportional to the molecular weight of the polymer. Thus, the higher the molecular weight, the lower the melt index, although the relationship is not linear.

The melt index for the high molecular weight component of the compositions, whether a homogeneously branched linear or homogeneously branched substantially linear ethylene interpolymer, used herein is generally from about 0.001 dg/min to about 50 dg/min, preferably from about 0.01 dg/min to about 30 dg/min, and especially from about 0.02 dg/min to about 10 dg/min.

The melt index of the low molecular weight fraction is from about 20 to about 5000, preferably from about 100 to about 4000, most preferably from about 200 to about 3000 dg/min.

The melt index range of the final blend or composition is from about 0.5 to about 50 dg/min, preferably from about 1 to about 25 dg/min, most preferably from about 4 to about 15 dg/min.

Another measurement useful in characterizing the molecular weight of the homogeneously branched linear or homogeneously branched substantially linear olefin polymers is conveniently indicated using a melt index measurement according to ASTM D-1238, Condition 190° C./10 kg (formally known as "Condition (N)" and also known as $I_{10}$). The ratio of these two melt index terms is the melt flow ratio and is designated as $I_{10}/I_2$, which also indicates the processability of that polymer. For the individual component substantially linear ethylene/a-olefin polymers used in the present invention, the $I_{10}/I_2$ ratio indicates the degree of long chain branching, especially for polymers having relatively low $I_2$ (e.g., $I_2$ from about 0.01 to about 50 dg/min), i.e., the higher the $I_{10}/I_2$ ratio, the more long chain branching in the polymer. Generally, the $I_{10}/I_2$ ratio of the individual component substantially linear ethylene/α-olefin polymers is at least about 5.63, preferably at least about 7, especially at least about 8 or above. The upper limit of the $I_{10}/I_2$ ratio for the individual components can be about 50, preferably about 20, and especially about 15. For the novel substantially linear ethylene interpolymer compositions used in the invention, the melt flow ratio $(I_{10}/I_2)$ can be increased through blending, either discrete interpolymer blends or in-situ reactor polymerized blends. The higher $I_{10}/I_2$ indicates the degree of flowability and/or processability, thus the higher the $I_{10}/I_2$, the more likely the interpolymer composition can be formed into a desired gasket without surface abnormalities. For the novel substantially linear ethylene interpolymer compositions used in the invention, the melt flow ratio $(I_{10}/I_2)$ is from 6 to 51, preferably from 10 to 42, most preferably from 15 to 33.

Figure 6:
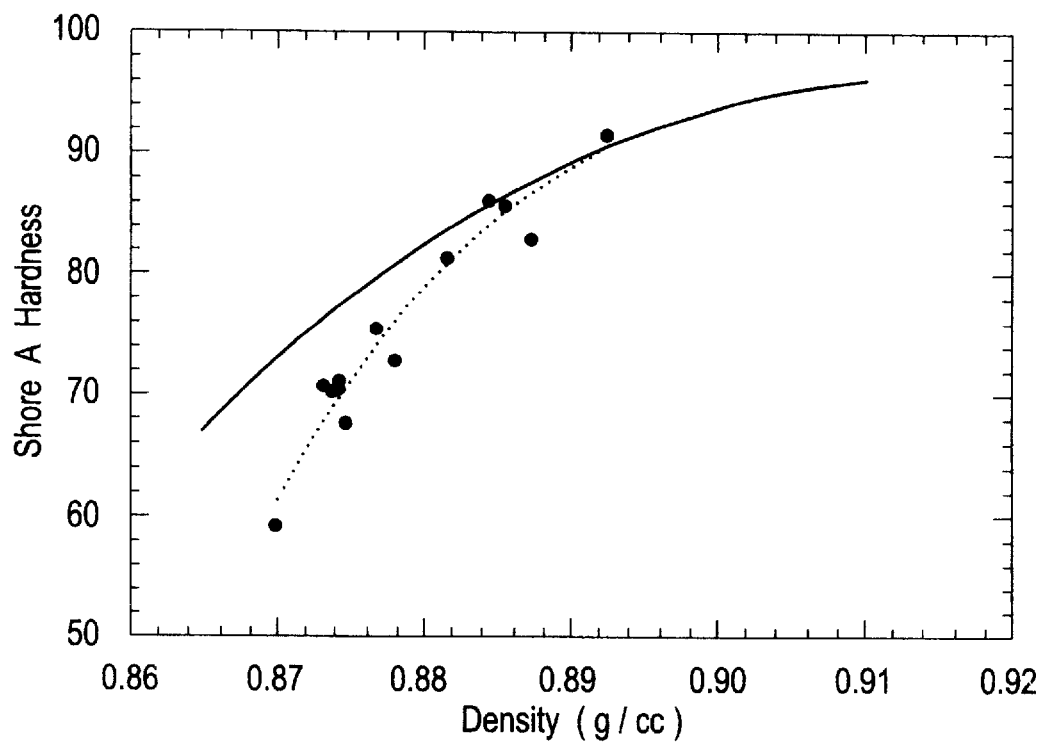
FIG. 6 compares Shore A Hardness against density for conventional narrow molecular weight distribution polyethylene (solid line) versus the broader molecular weight distribution polyethylene compositions (dotted line) of the present invention.

The gaskets made from the novel substantially linear ethylene interpolymers must be flexible enough such that an adequate seal is formed. Flexibility may be indicated by modulus, or for polyolefins, it may be indicated by Shore A hardness. Hardness is measured herein as "Shore A" hardness (as determined using ASTM D-2240). For the substantially linear ethylene interpolymer compositions which comprise the gaskets, the Shore A hardness ranges from about 50 to about 98, even without the use of petroleum oils or plasticisers commonly included to reduce the hardness of the polymer and resulting gasket. Table 3 summarizes Shore A data versus polymer density for three interpolymer compositions useful in the present invention, while FIG. 6 graphically shows the reduction in Shore A for the novel compositions of the invention as compared to conventional narrow MWD polyethylene.

Molecular Weight Distribution Determination

The whole interpolymer product samples and the individual interpolymer components are analyzed by gel permeation chromatography (GPC) on a Waters 150° C. high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene} = a^* (M_{polystyrene})^b.$$

In this equation, a $=0.4316$ and b $=1.0$. Weight average molecular weight, $M_w$, and number average molecular weight, $M_n$, is calculated in the usual manner according to the following formula:

$$M_j = (\Sigma w_i(M_i^j))^j;$$

where $w_i$ is the weight fraction of the molecules with molecular weight $M_i$ eluting from the GPC column in fraction i and j $=1$ when calculating $M_w$ and j $=-1$ when calculating $M_n$.

The molecular weight distribution ($M_w/M_n$) for the individual component substantially linear ethylene interpolymers or homogeneous linear ethylene interpolymers used in the invention is generally from about 1.8 to about 2.8. The molecular weight distribution ($M_w/M_n$) for the compositions comprising the substantially linear ethylene interpolymers or homogeneous linear ethylene interpolymers used in the invention is generally from about 2 to about 14, preferably from about 3 to about 10, especially from about 4 to about 8.

An apparent shear stress vs. apparent shear rate plot is generally used to identify the melt fracture phenomena. According to Ramamurthy in *Journal of Rheology*, 30(2), 337–357,1986, above a certain critical flow rate, the observed extrudate irregularities may be broadly classified into two main types: surface melt fracture and gross melt fracture. Surface melt fracture occurs under apparently steady flow conditions and ranges in detail from loss of specular gloss to the more severe form of "sharkskin". In this disclosure, the onset of surface melt fracture is characterized as the point where the extruded profile loses surface gloss (surface quality was evaluated using a 10× magnifying glass).

As shown in Table 4, gaskets produced from substantially linear ethylene/alpha-olefin interpolymers develop surface imperfections at a shear stress of about 0.20±0.03 MPa $(2.0 \times 10^6 \pm 0.3 + 10^6$ dynes/cm$^2$). However, as shown in Table 5, a door gasket produced by extruding Polymer Blends B and C did not develop surface imperfections. The gasket profile produced from Polymer Blend A contained minor strips of melt fracture along the length of the part, these strips of melt fracture were a result of die imperfections, i.e., die-lines, as shown in Table 5. The fact that melt fracture was not observed while extruding Polymer Blend B and C was surprising, given the very high shear stress levels, e.g., 0.651 and 0.850 MPa, respectively, as shown in Table 5. For example, it is generally assumed that the development of surface defects is determined by the shear stress level.

Melt fracture of ethylene interpolymer compositions is also very dependent upon die design, e.g., entrance geometry, length to width ratio of the die land region and the material of construction (see J. Dealy, "Melt Rheology and its Role in Plastics Processing", Van Nostrand Reinhold, New York, 1990, Ch. 8, pages 336–341). Tuning the die to maintain constant face velocity throughout the profile of the gasket is common practice. Generally, this tuning process lead to a die which is more likely to produce melt fractured profiles, since the die land region is shortened. Of course melt fracture is also dependent on extrusion temperature and flow rate.

The substantially linear and linear ethylene polymers useful in the present invention are interpolymers of ethylene with at least one $C_3$–$C_{20}$α-olefin and/or $C_2$–$C_{20}$ acetylenically unsaturated monomer and/or $C_4$–$C_{18}$ diolefins. The substantially linear polymers used in the present invention can also be interpolymers of ethylene with at least one comonomer selected from the group consisting of $C_3$–$C_{20}$ alpha-olefins, conjugated dienes, and non-conjugated dienes and mixtures thereof. Ethylene/alpha-olefin/diene (EPDM) are also suitable for this invention and can include the above $C_3$–$C_{20}$α-olefins, and at least one nonconjugated diene (e.g., 5-ethylidene-2-norbornene) or conjugated diene (e.g., 1,3-pentadiene (commonly called piperylene)). The term "interpolymer" means that the polymer has at least two comonomers (e.g., a copolymer) and also includes more than two comonomers (e.g., terpolymers). Substantially linear ethylene/alpha-olefin copolymers are preferred however, and ethylene/$C_3$–$C_{20}$ α-olefin copolymers are especially preferred.

Polymerization of the Substantially Linear Homogeneously Branched Ethylene Interpolymer The substantially linear ethylene/(α-olefin interpolymers are made by using suitable constrained geometry catalysts, preferably constrained geometry catalysts as disclosed in U.S. application Ser. No.: 545,403, filed Jul. 3, 1990; U.S. Pat. No. 5,132,380; U.S. Pat. No. 5,064,802; U.S. Pat. No. 5,153,157; U.S. Pat. No. 5,470,993; U.S. Pat. No. 5,453,410; U.S. Pat. No. 5,374,696; U.S. Pat. No. 5,532,394; U.S. Pat. No. 5,494,874; U.S. Pat. No. 5,189,192; the teachings of all of which are incorporated herein by reference. The monocyclopentadienyl transition metal olefin polymerization catalysts taught in U.S. Pat. No. 5,026,798, the teachings of which are incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane or modified methyl aluminoxane (made, e.g., as described in U.S. Pat. No. 5,041,584, U.S. Pat. No. 4,544,762, U.S. Pat. 5,015,749, and/or U.S. Pat. No. 5,041,585, the disclosures of each of which are incorporated herein by reference) as well as inert, compatible, noncoordinating, ion forming compounds. Preferred cocatalysts are inert, noncoordinating, boron compounds.

The substantially linear ethylene polymers may be produced via a continuous (as opposed to a batch or semi-batch operation) controlled polymerization process using at least one reactor, but can also be produced using multiple reactors (e.g., using a multiple reactor configuration as described in U.S. Pat. No. 3,914,342, pending application Ser. No. 208, 068 filed Mar. 8, 1994, pending application Ser. No. 433,785 filed May 3, 1995 and pending application Ser. No. 452,472 filed May 26, 1995, the disclosure of each of which is incorporated herein by reference) at a polymerization temperature and pressure sufficient to produce the interpolymers having the desired properties.

The polymer compositions of the invention can be formed by any convenient method, including dry blending the individual components and subsequently melt mixing in a mixer or by mixing the components together directly in a mixer (e.g., a Banbury mixer, a Haake mixer, a Brabender internal mixer, or a single or twin screw extruder including a compounding extruder and a side-arm extruder employed directly downstream of a interpolymerization process.

Preferably, the blends are made by direct polymerization, without isolation of the blend components. Preferably, the gasket compositions of the invention are formed in-situ via the interpolymerization of various combinations of elastic substantially linear or linear olefin polymers in multiple reactors using either single or multiple catalysts. The reactors can be operated sequentially or in parallel. An exemplary in-situ interpolymerization process is disclosed in PCT Patent Publication WO 94/17112, incorporated herein by reference. An alternate approach would be to produce the blend in one reactor using multiple catalysts.

The weight fraction of the high molecular weight component is from about 90 to about 10 wt % (by weight of the gasket composition), with the remainder (10 to 90%) of lower molecular weight. Preferably, the weight fraction of the high molecular weight component is from about 15 to about 60 wt % with the most preferred being from about 20 to about 40 wt %.

Other polymers can also be combined with effective amounts of the substantially linear or linear ethylene polymer blends to make the gaskets as well, depending upon the end use properties required. These other polymers are thermoplastic polymers (i.e., melt processable) and include polymers such as highly branched low density polyethylene, ethylene/vinyl acetate copolymers, and ionomers such as ionomers made from ethylene/acrylic acid copolymers (e.g., PRIMACOR™ Adhesive Polymers made by The Dow Chemical Company).

Additives, such as antioxidants (e.g., hindered phenolics, such as Irganox™ 1010 or Irganox™ 1076 supplied by Ciba Geigy), phosphates (e.g., Irgafos™ 168 also supplied by Ciba Geigy), Standostab PEPQ™ (supplied by Sandoz), pigments, colorants, fillers, at least one processing aid selected from the group consisting of organo-silicones, fluoropolymers, and fluoro(co)polymers, and the like may also be included in the polymer mixture of the present invention. Gaskets formed from the polymer mixture of the present invention may also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Preferably at least one lubricant is included in the gasket compositions. Lubricants such as erucamide are especially useful in the compositions at levels from about 500 ppm to about 10,000 ppm (1%), preferably about 2700 ppm.

For example, the addition of ten percent (by weight of the composition) of a 2.7% erucamide concentrate (in a similar substantially linear ethylene polymer) improves the extrusion of the gasket. Use of a Teflon® (made by E.l. duPont de Nemours, Inc.) based mold release agent or permanent Teflon® coating of the shaping blocks is also recommended to lower the coefficient of friction during extrusion. The addition of 5000 ppm of Ucarsil PA-1 processing aid (Ucarsil PA-1 is an organomodified polydimethylsiloxane manufactured by Union Carbide (U.S. Pat. No. 4,535,113)), has been found helpful for preventing surface imperfections in the homogeneously branched ethylene polymers.

The polymer mixture of the invention may further include recycled and scrap materials and diluent polymers (e.g., defective gaskets made from similar virgin compositions), to the extent that the desired performance properties are maintained.

In addition to forming gaskets for appliances and weatherstripping, the gasket compositions disclosed herein are also useful in irradiated or cured applications such as for medical and automotive applications, e.g., medical tubing and automotive weather stripping.

EXAMPLES

Materials & polymerization conditions

The homogeneously branched substantially linear ethylene/1-octene interpolymers used in the examples herein are produced in accordance with pending application Ser. No. 208,068 filed Mar. 8, 1994, now abandoned, pending application Ser. No. 433,785 filed May 3, 1995, now abandoned, and pending application Ser. No. 452,472 filed May 26, 1995, now abandoned, with the exception that the percentage of the high molecular weight component changes from the percentages described in those applications. Further, each component is made using the same catalyst, but each component is polymerized at different temperatures.

Table 2 lists the specifications of the substantially linear ethylene/alpha-olefin interpolymer gasket compositions in detail.

TABLE 2

| Polymer Blend | | A | B | C |
|---|---|---|---|---|
| High Molecular Weight Component | Weight % | 42.5 | 33.7 | 33.5 |
| | Density (g/cm³)* | 0.864 | 0.861 | 0.869 |
| | I₂ (dg/min)**** | 0.43 | 0.09 | 0.15 |
| | M_w** | 148000 | 216900 | 192000 |
| | LCB/1000 C | 0.05 | 0.014 | 0.017 |
| Lower Molecular Weight Component | Weight % | 57.5 | 66.3 | 66.5 |
| | Density (g/cm³)*** | 0.875 | 0.883 | 0.890 |
| | I₂ (dg/min)**** | 2200 | 4540 | 1115 |
| | M_w** | 15480 | 12680 | 17420 |
| | LCB/10000 C | ~0.5 | ~0.7 | ~0.7 |

*Calculated using the density blending rule $(1/\rho_f = w_1/\rho_1 + (1-w_1)\rho_2)$, where $\rho_f$, $\rho_1$ and $\rho_2$ represent the overall, high molecular weight and low molecular weight components densities, respectively, and $w_1$ is the weight fraction of the high molecular weight component. $\rho_f$ was measured using ASTM D792 and $\rho_2$ was measured via DSC.
**Calculated via fitting the experimental GPC to a most probable distribution
***Calculated from the DSC thermogram
****melt index ($I_2$) was calculated using: $\ln(I_2) = 62.781735 - 3.861973 * \ln(M_w) - 1.7909488 * \ln(I_{10}/I_2) - 16.309713$ (assuming $I_{10}/I_2 = 8.0$).

Methods

Door gaskets are produced using a 3.5" inch extruder, L/D=24, with a single flighted screw. A flat plate profile die with a cross-sectional area of 0.0758 square inches and having a minimum die gap of 0.015 inches is used to produce gaskets from Polymer Blend B and C. A flat plate die with a cross sectional area of 0.0869 square inches and having a minimum die gap of 0.010 inches is used to produced gaskets from Polymer Blend A. Once extruded, the profile is passed through three shaping blocks and into a cooling trough at 18° C.

The presence of melt fracture is determined visually using a 10X magnification eye-piece.

Melt strength was evaluated from the part definition and the ease of guiding the profile through the three shaping blocks.

Door gaskets are produced by extruding Polymer Blend A at 142° C. at 47.2 kg/hr (103.9 lb/hr) or 18.5 m/min (60.6 ft/min), as shown in Table 5. Given the lower density of Blend A, and the high extrusion temperature, the shaping blocks were not used since Blend A would stick to the shaping blocks. As a result, profile definition was very poor.

Door gaskets are produced by extruding Polymer Blend B at 91.7° C. at 14.0 kg/hr (30.9 lb/hr) or 6.4 m/min (21.0 ft/min) and by extruding polymer blend C at 98.9° C., at 20.6 kg/hr (45.4 lb/hr) or 9.1 m/min (30.0 ft/min), as shown in Table 5. Gaskets produced using Polymer Blends B and C are free of surface flow defects (melt fracture) even at these very low extrusion temperatures and very high shear stresses. Profile definition is also acceptable (three shaping blocks are used) which indicated that the melt strength was acceptable.

Discussion

Table 3 compares the physical properties of substantially linear ethylene/alpha-olefin interpolymer gasket compositions with a conventional single component substantially linear alpha-olefin interpolymer gasket. Note the broader molecular weight distribution ($M_w/M_n$) of the substantially linear ethylene/alpha-olefin interpolymer gasket compositions, as indicated by the $I_{10}/I_2$ and polydispersity ($M_w/M_n$). While not wishing to be bound by any particular theory, we believe it is the broader $M_w/M_n$ that produces the desired rheological changes, e.g., higher low shear viscosity with lower high shear viscosity, as shown in FIG. 1. These are the key rheological changes which are critical to this invention. More specifically, the low shear viscosity or melt strength of substantially linear ethylene/alpha-olefin interpolymers must be increased to improve the part definition while the high shear viscosity must remain low to prevent melt fracture. Melt strength of the substantially linear ethylene/alpha-olefin interpolymer gasket compositions could be improved by lowering the melt index, e.g., 6.0 dg/min, to increase the melt strength.

As the difference in density between the two blend components increases, one can increase the rate at which the gasket sets up (solidifies) and improve the upper service temperature. Although the maximum difference in density between the blend components listed in Table 2 is 0.022 g/cm³ (Blend B), a density difference of 0.072 g/cm³ has been achieved as well.

TABLE 3

Comparison of physical properties of Each Composition

| Physical Property | Affinity ™ HM1100 | Blend A | Blend B | Blend C | TPO | Flexible PVC** |
|---|---|---|---|---|---|---|
| % of High Mw Fraction | — | 42.5 | 33.7 | 33.5 | — | — |
| I₂ (dg/min) | 15.91 | 10.81 | 10.57 | 9.03 | 0.33 | 2.75 |
| I₁₀/I₂ | 7.39 | 19.83 | 27.0 | 19.19 | 71.06 | 25.59 |
| Density (g/cm³) | 0.8733 | 0.8704 | 0.8747 | 0.8821 | 0.995 | 1.389 |
| M_w | 59700 | 71800 | 77500 | 75900 | — | — |
| M_n | 29200 | 12400 | 8700 | 12400 | — | — |
| M_w/M_n | 2.04 | 5.79 | 8.908 | 6.12 | — | — |
| η @ 0.1 Hz) (poise) | 5740 | 10545 | 14454 | 15382 | 1420000 | 347700 |
| η @ 100 Hz) (poise) | 3440 | 3311 | 2891 | 3311 | 9920 | 5284 |
| η ratio | 1.67 | 3.18 | 5.00 | 4.65 | 115 | 65.8 |
| Melt Strength (cN)* | — | 2.74 | 2.23 | 2.97 | 7.64 | 8.12 |

TABLE 3-continued

Comparison of physical properties of Each Composition

| Physical Property | Affinity ™ HM1100 | Blend A | Blend B | Blend C | TPO | Flexible PVC** |
|---|---|---|---|---|---|---|
| Hardness (Shore A) | — | 59.2 | 70.4 | 81.2 | 69 | 82.2 |
| Tensile Break (psi) | 764 | 765 | 980 | 1340 | 285 | 1428 |
| Strain at Break (%) | 1118 | 1461 | 999 | 979 | 156 | 302 |

Affinity ™ HM1100 is a substantially linear ethylene/1-octene copolymer trademarked and produced by The Dow Chemical Company
*Melt strength at 120° C.
**Flexible PVC = fully formulated compound for gaskets (i.e., includes plasticizers, stabilizers, color, etc.)

As a comparison, door gaskets using a commercially available substantially linear polyethylene having $M_w/M_n$ of about 2 are produced using a 3.5 inch extruder having a L/D =24 with a single flighted screw with a deep Maddox mixing section at the tip. A flat plate profile die with a cross sectional area of 0.0869 square inches is used to produce the door gasket. Melt fracture and melt strength determinations are of a qualitative nature. The presence of melt fracture is determined visually using a 10× magnification eye piece. Melt strength is evaluated from the part definition and the ease of guiding the profile through the shaping blocks.

Table 4 shows initial results where single component (i.e., $M_w/M_n$ of about 2) substantially linear ethylene/alpha-olefin interpolymers having melt indices of 1, 5, 13, and 30 are converted into door gaskets. The substantially linear ethylene/alpha-olefin interpolymers all exhibit melt fracture (loss of surface gloss) at output rates below the commercial targets of 60 lbs/hr and 35 ft/min. Although the output of the 30 Ml resin (58 lb/hr) is close to the commercial target, this resin does not have enough melt strength to be converted into gasket, e.g., the resin simply drools from the die with no profile definition. In fact, the resin at 13 Ml does not have the required melt strength. Table 4 also shows that the addition of 5000 ppm processing aid (Ucarsil PA-1) to the 1.0 Ml substantially linear ethylene/alpha-olefin interpolymer does not increase the output rate to the commercial target, although the output rate is approximately doubled. Even though the output rate is doubled, this is still a factor of three lower than acceptable commercial rates.

TABLE 4

Comparative Examples
Profile extrusion of door gaskets using single component substantially linear ethylene interpolymers

| MI | Density (g/cm³) | Melt Temp °F. | Output (lb/hr) | Line Speed (ft/min) | Shear Rate* (s⁻¹) | Shear Stress* (MPa) | Surface Melt Fracture | Enough Melt Strength |
|---|---|---|---|---|---|---|---|---|
| 1 | 0.87 | 468 | 10 | 6.0 | 722 | 0.236 | Yes | Yes |
| 5 | 0.87 | 380 | 11 | 6.6 | 791 | 0.178 | Yes | Yes |
| 5 | 0.895 | 383 | 15 | 8.5 | 1020 | 0.226 | Yes | Yes |
| 13 | 0.87 | 381 | 33 | 19.3 | 2310 | 0.167 | Yes | Yes |
| 30 | 0.87 | 300 | 58 | 33.9 | 4069 | 0.199 | Yes | Yes |
| 1[a] | 0.87 | 200 | 19.5 | 11.4 | 1365 | 0.441 | Yes | Yes |

[a]resin contains 5000 ppm Ucarsil PA-1 processing aid (Ucarsil PA-1 is an organomodified polydimethylsiloxane manufactured by Union Carbide (U.S. Pat. No. 4,535,113)).
*Shear rate and shear stress values are at the onset of surface melt fracture, e.g., loss of surface gloss, die cross sectional area = 0.0869 in², narrowest die gap = 0.01 in.

TABLE 5

Profile extrusion of door gaskets using single substantially linear ethylene interpolymer Blends A, B and C.

| Blend | Melt Temp °F. | Output (lb/hr) | Line Speed (ft/min) | Shear Rate (s⁻¹) | Shear Stress (MPa) | Surface Melt Fracture | Enough Melt Strength |
|---|---|---|---|---|---|---|---|
| A[1] | 142 | 103.9 | 60.6 | 7274 | 0.325[a] | Yes | Yes |
| B[2] | 91.7 | 30.9 | 21.0 | 1651 | >0.651[b] | No | Yes |
| C[2] | 98.9 | 45.4 | 30.0 | 2394 | >0.850[b] | No | Yes |

[a]Blend A gasket contained small strips of surface melt fracture along the length of the gasket profile, due to die lines or die imperfections
[b]surface melt fracture was not observed on gaskets produced from Blend B and Blend C, thus the "greater than" symbol
[1]Die cross sectional area = 0.0869 in², narrowest die gap = 0.01 in.
[2]Die cross sectional area = 0.0758 in², narrowest die gap = 0.015 in.

Although the invention has been described in considerable detail through the preceding specific embodiments, it is to be understood that these embodiments are for purposes of illustration only. Many variations and modifications can be made by one skilled in the art without departing from the spirit and scope of the invention.

We claim:

1. A gasket composition comprising:
    (A) at least one "linear or substantially linear" homogeneously branched ethylene/α-olefin interpolymer that comprises from about 10 to about 90 weight percent, by weight of the gasket composition., said homogeneously branched interpolymer having a melt index as measured by ASTM 1238 at 190° C./2.16 Kg from about 0.001 dg/min to about 50 dg/min;
    (B) at least one second "linear or substantially linear" homogeneously branched ethylene/α-olefin interpolymer having a melt index as measured by ASTM 1238 at 190° C./2.16 Kg greater than (A) and a melt index as measured by ASTM 1238 at 190° C./2.16 Kg from about 20 dg/min to about 5000 dg/min;
    where (A) and (B) have a density difference of 0002 g/cm³ and greater up to about 0.11 g/cm³; and wherein the resulting gasket composition has an overall melt index as measured by ASTM 1238 at 190° C./2.16 Kg of about 4 to about 15 dg/min, $M_w/M_n$ from 2 to about 14, and a density of 0.857 g/cm³ to about 0.895 g/cm³.

2. The gasket composition of claim 1 wherein (A) has a melt index as measured by ASTM 1238 at 190° C./2.16 Kg from about 0.01 to about 30 dg/min.

3. The gasket composition of claim 1 wherein (B) has a melt index as measured by ASTM 1238 at 190° C./2.16 Kg from about 100 to about 4000 dg/min.

4. The gasket composition of claim 1 wherein each of (A) and (B) is a substantially linear ethylene/alpha-olefin interpolymer.

5. The gasket composition of claim 1 wherein each of (A) and (B) is a linear ethylene/alpha-olefin interpolymer.

6. The gasket composition of claim 1 wherein the alpha-olefin is a $C_3$–$C_{20}$ alpha-olefin.

7. A gasket composition according to claim 1 which also contains at least one lubricant.

8. The gasket composition according to claim 7 wherein the lubricant is erucamide.

9. A gasket composition according to claim 1 which also contains at least one polymer processing aid.

10. The gasket composition of claim 9 wherein the processing aid is selected from the group consisting of organo-silicones, fluoropolymers and fluoro(co)polymers.

* * * * *